F. D. EVERETT.
TRANSMISSION APPARATUS.
APPLICATION FILED SEPT. 6, 1917.
1,283,711.
Patented Nov. 5, 1918.
4 SHEETS—SHEET 1.
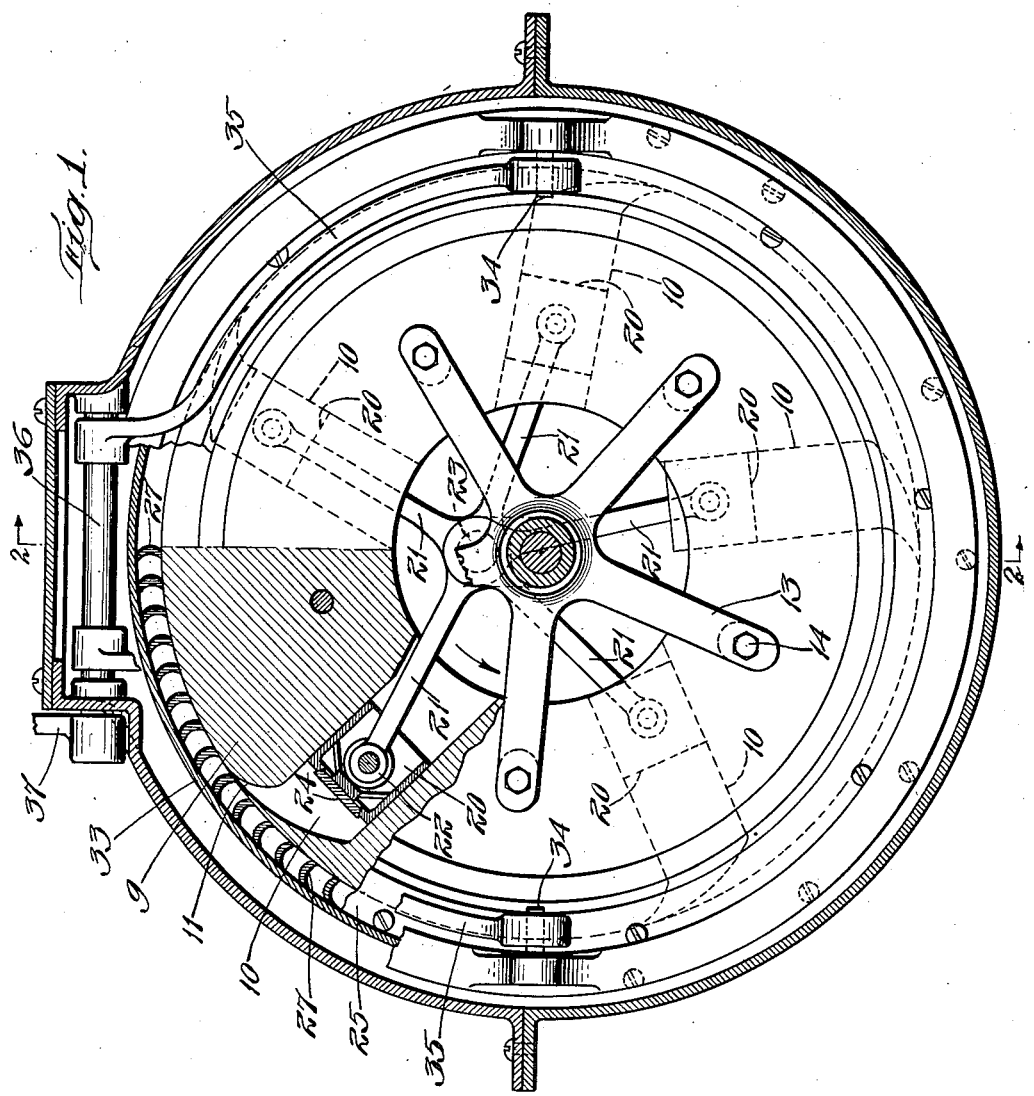

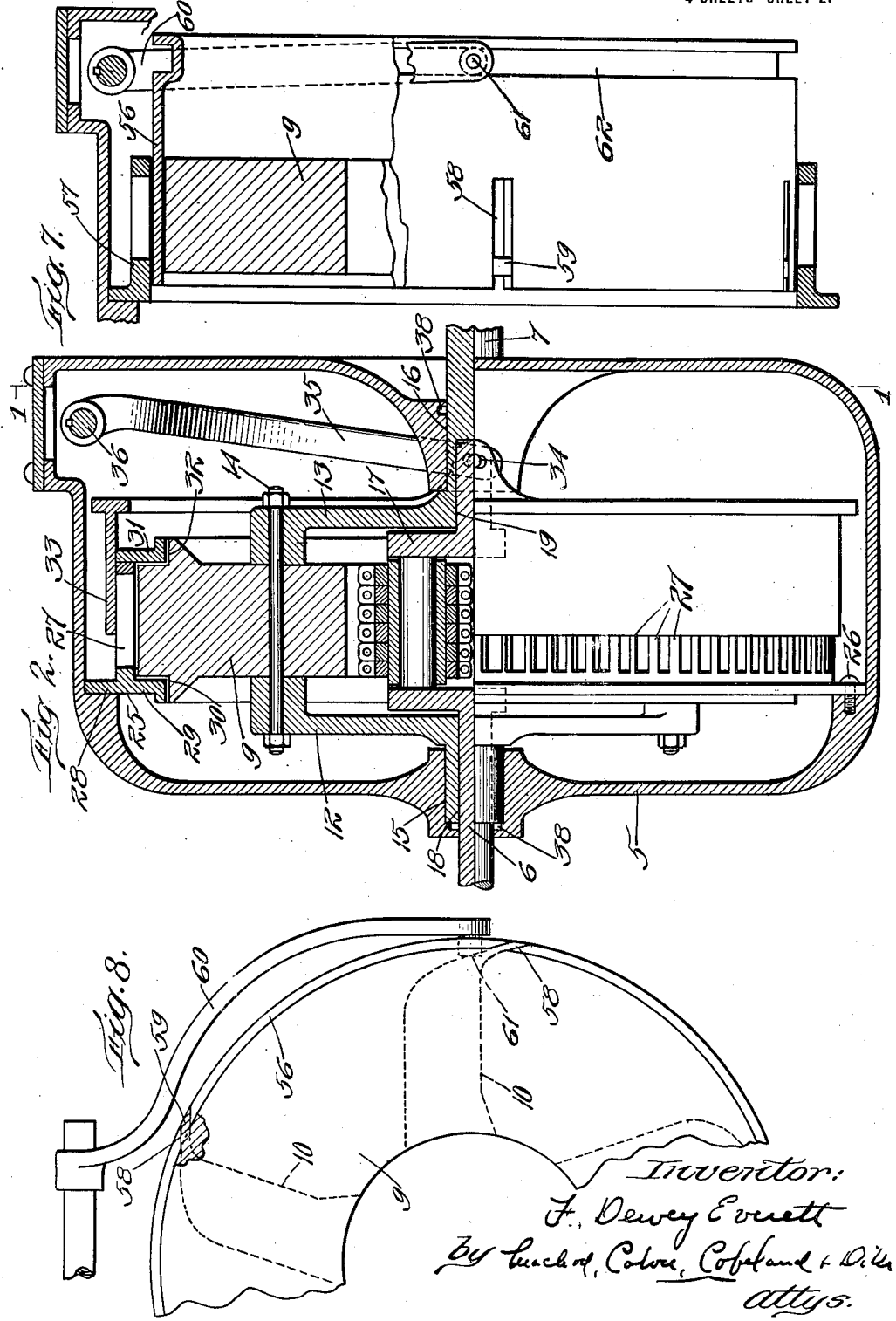

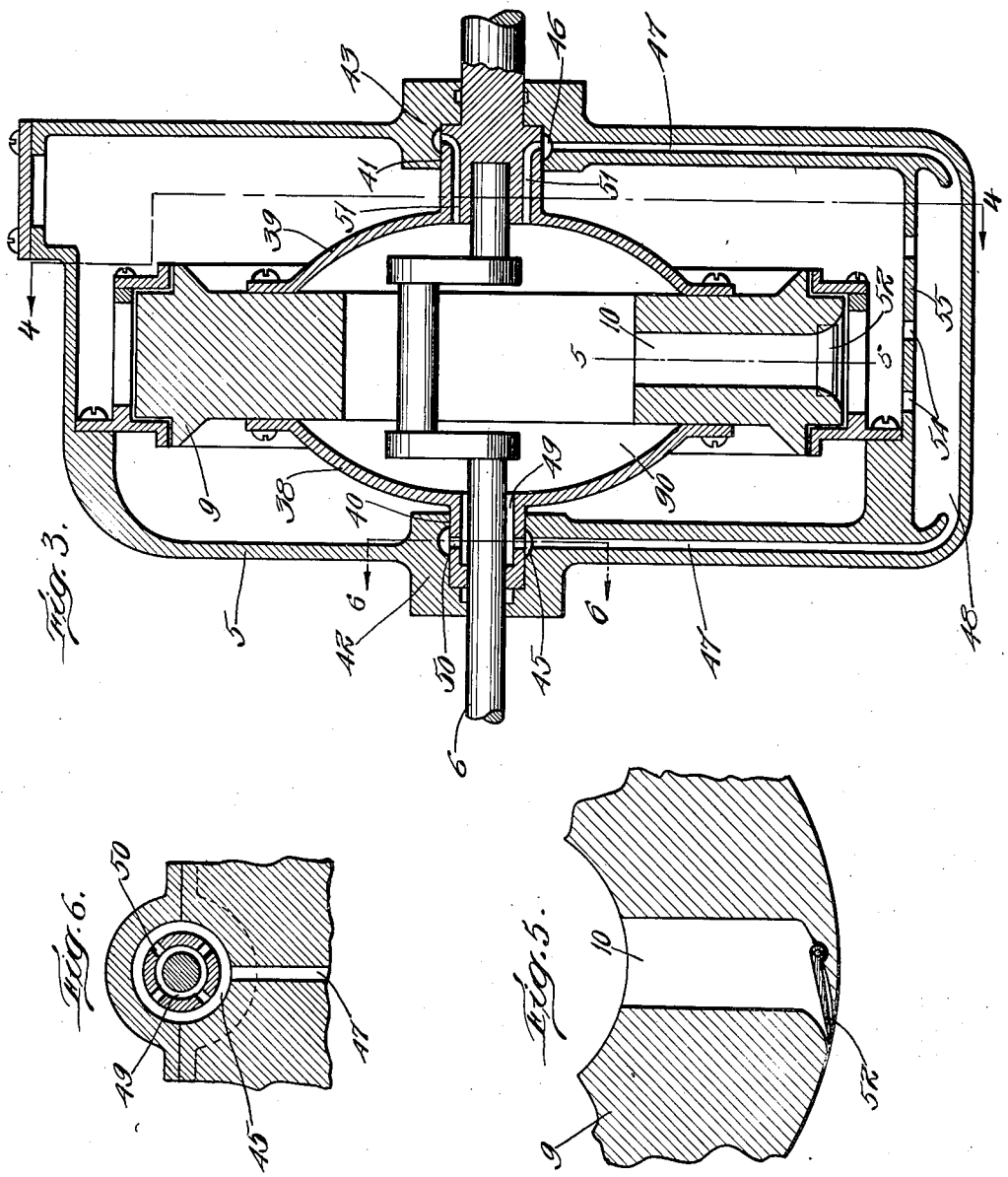

F. D. EVERETT.
TRANSMISSION APPARATUS.
APPLICATION FILED SEPT. 6, 1917.
1,283,711.
Patented Nov. 5, 1918.
4 SHEETS—SHEET 4.
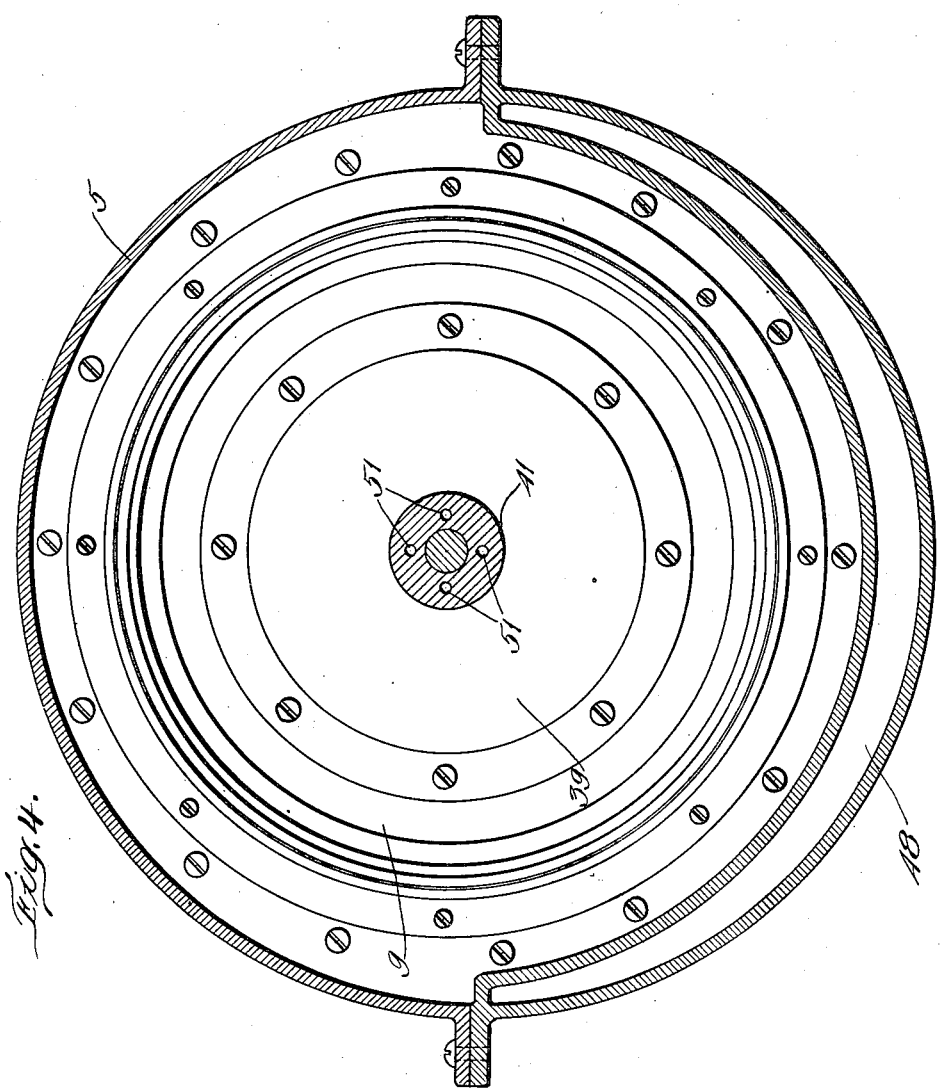

UNITED STATES PATENT OFFICE.

FRANCIS DEWEY EVERETT, OF SARANAC LAKE, NEW YORK.

TRANSMISSION APPARATUS.

1,283,711.  Specification of Letters Patent.  Patented Nov. 5, 1918.

Application filed September 6, 1917. Serial No. 190,013.

*To all whom it may concern:*

Be it known that I, FRANCIS DEWEY EVERETT, a citizen of the United States, residing at Saranac Lake, county of Essex, State of New York, have invented a certain new and useful Improvement in Transmission Apparatus, of which the following is a specification, reference being had therein to the accompanying drawings.

My invention relates to a power transmission apparatus and has for its object to provide an improved power transmission apparatus having a variable speed. I have shown in the drawings and described in the specification my improvements in power transmission apparatus as applied to and used in connection with an automobile to take the place of the ordinary transmission and to provide a wide range of speeds and a smooth transition from one speed to another without the use of a clutch but it will be understood that my improvements can be combined with and used in connection with other classes of vehicles or in any connection where a variable speed transmission between a prime mover and a driven element is desired.

My invention consists in certain novel features of construction which will be fully understood when taken in connection with the accompanying drawings and the novel features thereof will be pointed out and clearly defined in the claims at the close of this specification.

In the drawings,

Figure 1 is a side view of the mechanism shown in Fig. 2, embodying the invention the housing being shown in section on line 1—1 of Fig. 2, and part of the interior mechanism being broken away for purposes of illustration.

Fig. 2 is a vertical section on line 2—2 of Fig. 1, the lower portion of the internal mechanism being shown in full.

Fig. 3 is a view similar to Fig. 2 showing a modified form of construction some of the parts being omitted to more clearly illustrate certain of the features of this construction.

Fig. 4 is a sectional view taken on line 4—4 of Fig. 3.

Fig. 5 is a section on line 5—5 of Fig. 3.

Fig. 6 is a section on line 6—6 of Fig. 3.

Fig. 7 is a side elevation partly in section of another modified form of device embodying my invention.

Fig. 8 is a detail view illustrative of the form shown in Fig. 7.

In place of the gear transmission case ordinarily used in automobiles, my gear transmission apparatus is substituted. The housing 5 contains the several parts of my apparatus to be hereinafter described. The shaft 6 is driven through a suitable clutch, not shown, by the prime mover, in this case the engine of the automobile, and the shaft 7 drives the driven element, in this case the gears of the differential case, or the clutch may be placed on shaft 7 instead of shaft 6, thus keeping the transmission always connected directly to the engine.

In Figs. 1 and 2 is shown the improved transmission apparatus embodying my invention. It consists of an annulus or ring 9 formed with cylinders 10, having the shape shown, and provided with openings 11 on the outer rim of the annulus 9. The number of cylinders formed in the ring may be varied and their axes may be inclined to the radii as shown in Fig. 1 or along radii if desired without departing from the scope of my invention.

The annulus or ring 9 is mounted between spiders 12 and 13 secured to the annulus by bolts 14 or the like, the former of which is journaled at 15 in the casing 5, and the latter of which is journaled at 16 in the casing 5 and is secured to the propeller shaft 7 being herein shown as integral therewith. The shaft 6 is provided with a crank 17 which is located within the central opening of the annulus 9 and is journaled at 18 and 19 within the journals of the spiders 12 and 13 respectively. In this way the annulus or ring 9 is centered in the casing 5 and the shaft 6 is centered in the hollow central part of the ring or annulus 9. The parts are thus rotatable independently of each other. Within the cylinders 10 are pistons 20 each of which is attached to the crank 17 by connecting rods 21 having bearings 22 and 23 at each end by which they are secured to the piston and crank respectively. A one way valve 24 of any common form is located in each piston 20 and is adapted to seat and prevent a flow of liquid toward the center of the annulus and to open to permit a flow of liquid outwardly from the center of the annulus, for purposes hereinafter to be set forth.

A ring 25 surrounds the rim of the annulus 9 and is secured to the casing 5 by suitable screws 26. It is composed of a succession of blades or vanes 27 having openings between them, the blades being preferably curved in cross section as shown in Fig. 1. The left hand edge of the ring 25 as seen in Fig. 2 has an outwardly extending flange 28 by which it is secured to the casing as described, and an inwardly extending flange 29 in cross section preferably of the shape shown which is recessed within an annular groove 30 of corresponding shape formed in the annulus 9. The ring 25 also has a flange 31 preferably detachably connected with it, which is substantially L-shaped in cross section and is received within an annular groove 32 at the other side of the annulus. The ring 25 thus incloses the outer periphery of the annulus 9, the parts being arranged to make a sliding fit so that the annulus is capable of free rotation.

A ring or gate 33 fits over the ring 25 and makes a snug sliding fit therewith. It is attached by pins 34 to a pair of arms 35 which are keyed or otherwise suitably attached to a rod 36 journaled in the upper part of the casing 5. One end of the rod 36 projects through the casing 5 and an operating lever 37 is secured to it. The lever affords means for oscillating the rod 36 and accordingly for affording a transverse movement of the solid ring or gate 33. In this way the openings between the vanes or blades may be left fully uncovered or may be completely or partly covered as desired.

The whole case is filled with some form of liquid, preferably oil, and in order to prevent undue leakage at the bearings of the spiders 12 and 13 and the shaft 6, I provide an annular groove 38 in each bearing which may be filled with any form of packing material.

The operation of the device just described is as follows: If the shaft 6 is driven in a counter clock wise direction as shown by the arrow in Fig. 1 and the annulus 9 is connected with the load through the shaft 7, the crank shaft will tend to move relatively to the annulus 9 and to reciprocate the pistons in the cylinders 10. The pistons will therefore act as pumps to force the liquid outwardly through the openings in the ring 25. The amount of liquid permitted to pass out through the openings may be controlled by the ring or gate 33. If the gate is completely shut the flow of liquid must cease and therefore the movement of the piston is arrested so that the annulus must turn with the shaft 6. On the other hand if the gate 33 is completely open the liquid may flow freely through the openings so that the movement of the pistons is only slightly impeded and therefore the annulus will turn at a slower speed than the shaft.

In this way the resistance offered to the pistons by the liquid may be controlled by the gate 33 so that the lag or slip of the annulus may be regulated as desired. Where the openings through the ring 25 are partly covered by the gate 33 a part of the force transmitted by the connecting rods 21 from the crank 17 will tend by the pressure on the cylinder walls to rotate the annulus 9 and the other component of the force will exert pressure on the oil in the cylinder and this pressure will be transmitted to the stationary vanes 27 where it reacts so as to turn the annulus although at a reduced speed for the gate being partly open the pistons are permitted to have a certain amount of movement.

The amount of torque developed by the reaction of the liquid on the vanes is dependent on two things, namely, the velocity of the liquid, and the quantity of the liquid. The quantity depends on the difference of the speed of rotation of the crank and the speed of rotation of the annulus. The velocity depends on two things, the quantity of liquid, and the degree of opening of the gate. The maximum quantity is when the car stands still and the engine is run at high speed. In case the gate is wide open the area of the discharge ports will be at a maximum, thus giving the lowest velocity of flow and so the smallest reaction tending to turn the annulus for any given engine speed. Now if the driven shaft 7 be held stationary, due to the load, and the gate be gradually closed and the engine speed remains constant the velocity of the liquid increases. Suppose, for example, the engine develops its maximum power at the speed S and has a torque at this speed of T. If the engine is maintained at the speed S, the load being so great as to hold the driven shaft stationary and the gate is closed until the resistance to the flow of the liquid is such as to oppose to the crank through the pistons the torque T there will be the same quantity of liquid as if the engine is run at the speed S with the gate wide open, but as the gate is being gradually closed the velocity of the liquid is increasing and will, therefore, provide greater reaction on the stationary vanes and in this way supplement the torque T of the engine until the load starts. The driven shaft will now turn and the difference in speed will decrease. If the gate is gradually closed the velocity will hold up in spite of the decrease in quantity but of course the additional torque supplied will fall off as the speed of the engine and driven shaft approach each other till when the gate is closed it will be zero and the torque will be only the torque T of the engine, at which time the car will be in high speed.

Thus the car is in lowest speed when the gate is wide open and there is no torque and at some intermediate point of opening the torque is at its maximum and so the machine is in low gear, and then as the gate is further closed the torque falls off as the car approaches high gear. This is due to the fact that the torque depends upon the product of the quantity and the velocity. Where the velocity is low and the quantity is high the resulting torque is low and where the velocity is increased faster than the quantity is decreased, the torque increases until the maximum torque of the motor is reached. Then as the quantity decreases the torque falls off as the speeds of the engine and driven shaft approach each other.

No fixed position of the gate can be set for low speed because this would depend upon the speed of the motor and the car. For example, if the engine was turning very slowly the gate might be half closed and the car still act as if in neutral, but if the throttle were open and the engine speeded up the quantity and velocity would increase and the car then begin to move.

The apparatus herein described affords a wide range of forward speeds and a smooth transition from one speed to the other without the use of a clutch to secure the said transition. A clutch is advisable to obtain a perfect neutral, but as that feature is not a part of the present invention it has not been deemed necessary to show a clutch. It has not been thought necessary to illustrate reverse mechanism. In that case a clutch and any well known form of reverse gear may be employed and the transmission embodying my invention used as a variable speed connection to afford a wide range of reverse speeds.

In Figs. 3-6 inclusive a modified form of construction is shown, many of the parts being omitted in order to illustrate more clearly the modified form of construction. In this device the open spiders 12 and 13 used in the preferred form are replaced by solid steel disks 38 and 39 by which the opening in the annulus 9 is completely inclosed. The disks 38 and 39 are provided with journals 40 and 41, mounted in suitable bearings 42 and 43, in the housing 5. The bearings 42 and 43, are formed with annular grooves 45 and 46 which are connected by passages 47 with an oil reservoir 48 in the bottom of the casing 5. The journal 40 is formed with an annular groove 49 and with connecting ports 50, as shown in Figs. 3 and 6, which provide passage for the oil from the groove 45 to the interior of the oil chamber 90 formed by the disks 38 and 39. The journal 41 is formed with oil passages 51 shown in Figs. 3 and 4 which connect the groove 46 in the bearing 43 with the interior of the oil chamber. A flap valve 52 of any common form, such as that shown in Fig. 5, is located in the exhaust opening of each cylinder and is so arranged that it permits liquid to pass from the center of the annulus 9 outwardly but closes on the reverse stroke of the piston.

In the modified form of construction just described it is not necessary to fill the whole case with oil or other liquid but only enough oil is necessary to fill the inclosed hollow center or liquid chamber centrally of the annulus and the liquid reservoir. The operation of the transmission will suck the liquid up from the reservoir 48 through the passageways 47 to the grooves 45 and 46, and thence through the passages 49, 50 and 51 to the oil chamber, from whence it will be pumped out by the action of the pistons through the vanes and into the empty casing from which it will pass through suitable holes 54 in the false bottom 55 to the oil reservoir.

In Figs. 7 and 8 still another modified form of construction is illustrated and here also, only a few of the parts are shown. In this case the ring or gate 56 is located between the ring 57, which carries the vanes or blades and the annulus 9, and is arranged to rotate with the annulus 9. The gate 56 is provided with transverse slots 58, one over each of the openings in the cylinders. The slots 58 are maintained in the proper position relative to the discharge openings in the annulus by suitable guide members 59 secured to the periphery of the annulus and projecting outwardly into the slots. The gate 56 is moved transversely of the annulus by means of arms 60 having projections 61, which are received within an annular groove 62 in the gate 56, the arms being operated by a suitable hand lever, not shown.

The exhaust openings in the cylinders 10 may thus be controlled by the gate 56 so that the flow of oil against the vanes in the ring 57 can be regulated.

While I have shown several forms of construction, I wish it to be understood that I do not limit myself to the arrangement and construction of the device as illustrated, for various forms of construction may be employed without departing from the spirit of my invention.

What I claim is:

1. The combination with a driving element and a driven element of a variable speed transmission which consists of a cylinder having an intake opening, a discharge opening, a piston and a one way valve, said cylinder being connected with one of said elements and revoluble relatively to the other of said elements and said piston being operatively connected with said other element and revoluble relatively to the same, a series of blades arranged adjacent the path of said discharge opening against which fluid from the discharge opening reacts, and tends to revolve said cylinder, and means for controlling the discharge of fluid through the discharge opening.

2. The combination with a driving element and a driven element of a variable speed transmission which consists of a cylinder having intake and discharge openings, a piston and a one way valve, said cylinder being revoluble about one of said elements and connected with the other of said elements, said piston being operatively connected with said other element and revoluble about the same, means for controlling the discharge of fluid through said discharge opening, and a series of blades adjacent the path of the discharge opening as said cylinder revolves against which fluid from the discharge opening reacts and further tends to revolve said cylinder.

3. In combination with a driving element and a driven element, a variable speed transmission which consists of a cylinder having a discharge and an intake opening, a piston and a one way valve, a crank driven by one of said elements and operatively connected with said piston, said cylinder being revoluble about said crank and connected with the other of said elements, a series of blades adjacent the path of revolution of said cylinder against which fluid discharged from the cylinder is adapted to react to cause the cylinder to revolve, and means for controlling the discharge of fluid through the discharge opening.

4. In combination with a driving element and a driven element, a variable speed transmission which consists of an annulus having a plurality of cylinders which are substantially radially disposed therein, each of said cylinders having an intake opening and a discharge opening, a piston and a one way valve, a crank centrally of said annulus which is driven by one of said elements and is operatively connected with each of said pistons, said annulus being revoluble relatively to said crank and connected with the other of said elements, a series of stationary blades located adjacent the path of said discharge openings when said annulus revolves against which a discharge from said cylinders reacts and tends to revolve the annulus, and means for controlling the discharge of fluid through said discharge openings.

5. In a device of the character described, the combination with a driving element and a driven element, of a rotatable annulus which is connected with one of said elements and is provided with a plurality of cylinders substantially radially disposed therein, each of said cylinders having an intake opening at their inner ends and a discharge opening at their outer ends and having a piston and a one way valve, a crank centrally of said annulus which is operatively connected to said pistons and is driven by the other of said elements, a ring about the outer periphery of said annulus which consists of a series of blades having spaces between them against which a discharge of fluid from said cylinders is adapted to react to revolve the said annulus, and a gate movable across said discharge openings by which the discharge of fluid may be controlled.

6. The improved transmission comprising a rotatable annulus having a plurality of cylinders which are substantially radially disposed therein, each of said cylinders being open at the inner end and having a discharge opening at the other end which is arranged to discharge liquid from the cylinders at an angle to its axis, a shaft rotatable independently of the annulus and having a crank centrally thereof, a pump plunger in each of said cylinders operatively connected with said crank and adapted to force liquid through said discharge opening when said annulus and crank move relatively to each other, a stationary ring surrounding the periphery of said annulus having a series of spaced blades therein against which a discharge from each of said discharge openings reacts, a gate movable across said openings by which a discharge therefrom may be controlled, and a liquid container inclosing said parts.

In testimony whereof I affix my signature.

F. DEWEY EVERETT.